Sept. 26, 1967 G. F. KINGHORN 3,344,342

METHOD OF SUB-SURFACE PROSPECTING BY GENERATING CURRENT IMPULSE BETWEEN A PAIR OF POINTS ON A FIRST LINE AND DETECTING VOLTAGES BETWEEN POINTS ALONG A LINE NORMAL TO THE FIRST LINE

Filed Jan. 8, 1965 4 Sheets-Sheet 1

FIG. 1

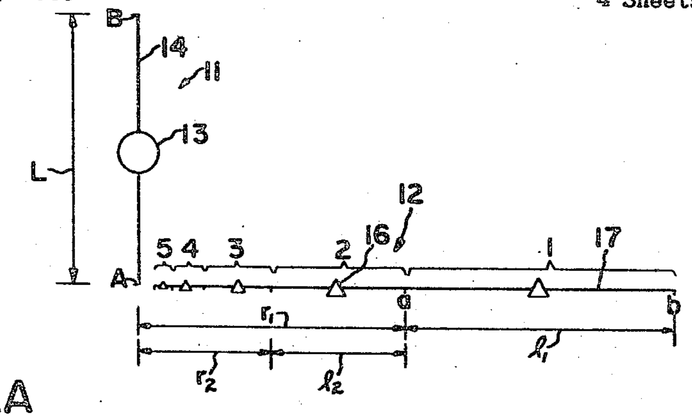

FIG. 2A, FIG. 2B, FIG. 2C

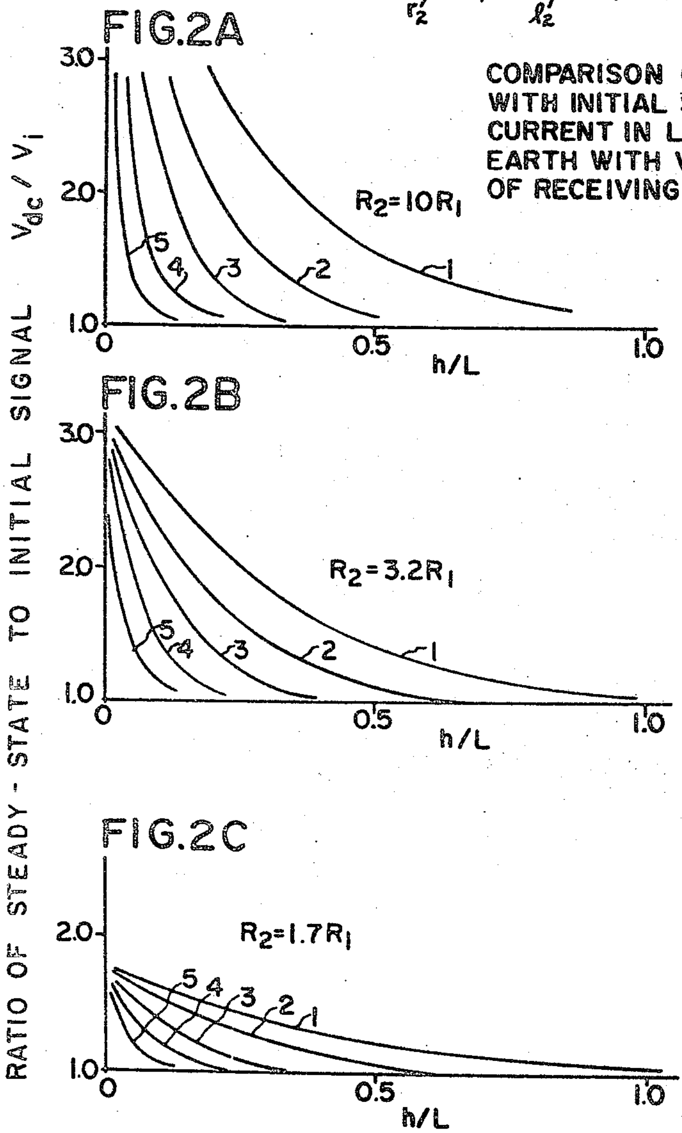

COMPARISON OF STEADY-STATE SIGNAL WITH INITIAL SIGNAL AFTER A STEP CURRENT IN LINE (A-B) FOR A TWO LAYER EARTH WITH VARIOUS CONFIGURATIONS OF RECEIVING WIRE (a-b)

1) r = ℓ = L
2) r = ℓ = L/2
3) r = ℓ = L/4
4) r = ℓ = L/8
5) r = ℓ = L/16

INVENTOR.
GEORGE F. KINGHORN

BY *Townsend and Townsend*

ATTORNEYS

COMPARISON OF STEADY-STATE SIGNAL WITH INITIAL SIGNAL AFTER A STEP CURRENT IN LINE (A-B) FOR A TWO LAYER EARTH

INVENTOR.
GEORGE F. KINGHORN
BY
Townsend and Townsend
ATTORNEYS

INVENTOR.
GEORGE F. KINGHORN
BY Townsend and Townsend
ATTORNEYS

METHOD OF SUB-SURFACE PROSPECTING BY GENERATING CURRENT IMPULSE BETWEEN A PAIR OF POINTS ON A FIRST LINE AND DETECTING VOLTAGES BETWEEN POINTS ALONG A LINE NORMAL TO THE FIRST LINE

Filed Jan. 8, 1965

INVENTOR.
GEORGE F. KINGHORN
BY
Townsend and Townsend
ATTORNEYS 3,344,342
Patented Sept. 26, 1967

3,344,342

METHOD OF SUB-SURFACE PROSPECTING BY GENERATING CURRENT IMPULSE BETWEEN A PAIR OF POINTS ON A FIRST LINE AND DETECTING VOLTAGES BETWEEN POINTS ALONG A LINE NORMAL TO THE FIRST LINE

George F. Kinghorn, 12493 Brookglen Drive, Saratoga, Calif. 95070

Filed Jan. 8, 1965, Ser. No. 424,411
5 Claims. (Cl. 324—9)

ABSTRACT OF THE DISCLOSURE

An electrical prospecting method is disclosed including the steps of establishing a step or square-wave current in the earth between a pair of transmission points along a first line, detecting the variation with time of the voltage created by the current between pairs of detection points lying on a second line normal to the first line and passing through one of the transmission points and comparing the wave form of the recorded voltages for determining the variation of resistance with depth in the earth. Detection can be on opposite sides and at each end of the transmission conductor. The distance between the closest detection and transmission points is equal to or greater than the depth in the earth to be evaluated and the length between the two transmission points is equal to or greater than such distance. Also, the spacing between each pair of detection points is equal to or less than such distance.

The present invention relates to electrical prospecting for deep mineral deposits using electrical impulses.

Electrical prospecting for deep mineral deposits, such as petroleum accumulations, using direct current has not been very successful because the near surface electrical characteristics of the earth predominantly determine the mutual impedance between electrical transmitter and receiver circuits located on the earth's surface. Therefore, the effect of a deep seated resistance change in the earth is masked by the effects of smaller near surface variations. Because of the time lag between transmission and reception of the effects due to deep seated electrical characteristics, the use of electrical transients has offered hope of separating deep seated effects from the near surface effects. It has been pointed out in U.S. Patent No. 2,234,956 to Solomon Bilinsky, that the use of perpendicular probe arrangements offers advantages in transient electrical prospecting since with such arrangements, the response to a transmitted current pulse for a homogeneous earth is a simple step function, and theoretically, variations from this step function represent a transient response indicating anomalous geological conditions. However, in practice, when such a transient has been observed, it has not been possible to estimate the sub-surface electrical characteristics with any reasonable degree of accuracy or confidence because of a number of factors. Principally, the amplitude and effective time lag of the transient are functions of many variables such as, the surface resistance, the number of sub-surface changes in resistance, and the depth, magnitude and abruptness of such variations. The effects of these many variables cannot be separated and evaluated from the limited data contained in a single transient response. In practice, the variation in resistance with depth is a very complex function requiring fairly extensive data to accurately define.

In accordance with the present invention, an improved method and apparatus are provided for obtaining accurate and reliable estimates of sub-surface resistance characteristics from surface transient electrical measurements by making multiple measurements, each of which is sensitive to resistance changes at a different depth. This is accomplished by measuring signals at different distances from the transmitter and comparing the results with theoretical calculations for different resistance changes.

In the preferred embodiment of the present invention, a step current is caused to flow in the transmitter circuit which includes two grounded transmitting points along a first line and a number of measurements are made of the voltage established by such current between different points along a second line which is normal to the first line. An initial step is observed in the detected voltage, and a subsequent increase or decrease in the voltage with time results if respectively an increase or decrease in formation resistance occurs with depth. The voltage finally stabilizers at the D.C. or steady state value. The ratio of the D.C. or steady state voltage to the initial step is therefore indicative of the sub-surface resistive changes.

Measurements made close to the transmitting circuit largely illustrate the near surface resistance characteristics while measurements made further from the transmitting circuit illustrate deeper resistance characteristics. To detect resistance changes at a depth $h$, measurements preferably are made with the nearest point of the detection line positioned a distance $r$ from the nearest point of the transmitter line substantially in accordance with the following equation:

$$h \leqq r$$

The distance $r$ from the detection line to the transmision line is preferably less than the length L of the transmission line in order to obtain a detected signal of sufficient strength. The induced potentials in the detecting line rapidly approach zero as the distance $r$ becomes large compared with L. The preferred arrangement is therefore indicated by the equation:

$$h \geqq r \geqq L$$

For the normal type of resistance change exhibited by a petroleum deposit the steady state reflected signal from the top of the reservoir is comparable to that of the initial step or direct signal for values of $r$ and L greater than $h$. Thus, with the magnitude of the reflected signal approaching that of the direct signal there will be little difficulty in distinguishing the reflected signal from the direct signal because of the characteristic delay or lag in the arrival of the reflected signal.

Another aspect of the present invention is the provision of a detection line that has a length $l$ equal to or shorter than the distance $r$ separating the detection line from the transmitting line. This is done to improve the signal to noise ratio and ease the field layout for the different detecting positions. The length $l$ is a compromise between the desire to maximize the signal and the desire to minimize noise. Thus, when the detection line becomes very long the additional signal picked up by adding additional lengths may be small compared with the noise picked up by the added lengths from local transmission lines, ground currents etc.

When utilizing a perpendicular arrangement of the transmitting and receiving wires, one of the major difficulties encountered in mapping a particular geographic area is the location and movement of the wires. In accordance with the present invention the transmitting wire which is as long as or longer than the different detection wires is moved parallel with the traverse across country, and the detection wires are moved along a line normal to the traverse. This arrangement has a number of advantages. First, since the transmitting wire must be relatively heavy gauge wire to handle the relatively heavy current flow through it, it is far easier to make several movements of the lighter gauge receiving wire while the transmitting wire is fixed in place. Furthermore, the electrodes at each end of the transmitter wire must be embedded in the earth relatively more elaborately and extensively than those of the detection wires to minimize the resistance to current flow at the earth-electrode contact. Additionally, with the transmitting wire positioned along the length of the traverse detection wires can be positioned first on one side of the transmitting wire and then moved directly across the transmitting wire to provide a complete picture of the subsurface structure. Furthermore, without moving the transmitting wire the detection wires can be located at first one end and then at the opposite end of the transmitting wire for taking readings at both ends. Then, after measurements have been made on both ends of the transmitting wire, the transmitting wire can be pulled along the traverse in the direction of its length to a new position at which detection can be made again at both ends thereof.

In accordance with an additional aspect of the present invention, the detection lines are not only positioned normal to the transmitting line but normal to the transmitting line at one of the transmitting points at the end of the transmission line. This layout simplifies the mutual impedance calculations for the transmitting and receiving lines and simplifies the field work in taking the detection measurements since the measurement of $r$ is made in a line coincident with the line on which the detection measurements are made and a person standing at the transmitting point can proceed with a measurement of $r$ in the direction in which the receiving line is to be layed. Additionally, with this arrangement there is no minimum distance $r$ along the detection line so that detection readings can be made with a detection line very close to the transmitting line to locate resistance discontinuities which are believed to exist very close to the surface. As pointed out above, the transmitting and receiving wires should not approach much closer to each other than the depth of possible discontinuities or the direct signal will be large compared with the reflected signal. Therefore, crossing of the transmission and detection wires must be avoided. Also, a T arrangement even with a gap between the leg and the top of the T is unsuitable since in this case the mutual impedance between the two wires is zero.

Other objects and advantages of the invention will become apparent upon reading the following specification and referring to the accompanying drawings in which similar characters of reference represent corresponding parts in each of the several views.

FIGURE 1 is a schematic view of the preferred arrangement of transmitting and detecting wires in performing the present invention;

FIGURES 2A–D are graphs each of which shows the comparison between the ratio of the steady state to initial signal plotted versus depth in the earth for a two layer earth for various configurations of the receiving wire for a particular ratio of resistance in the two layers;

Figure 8:
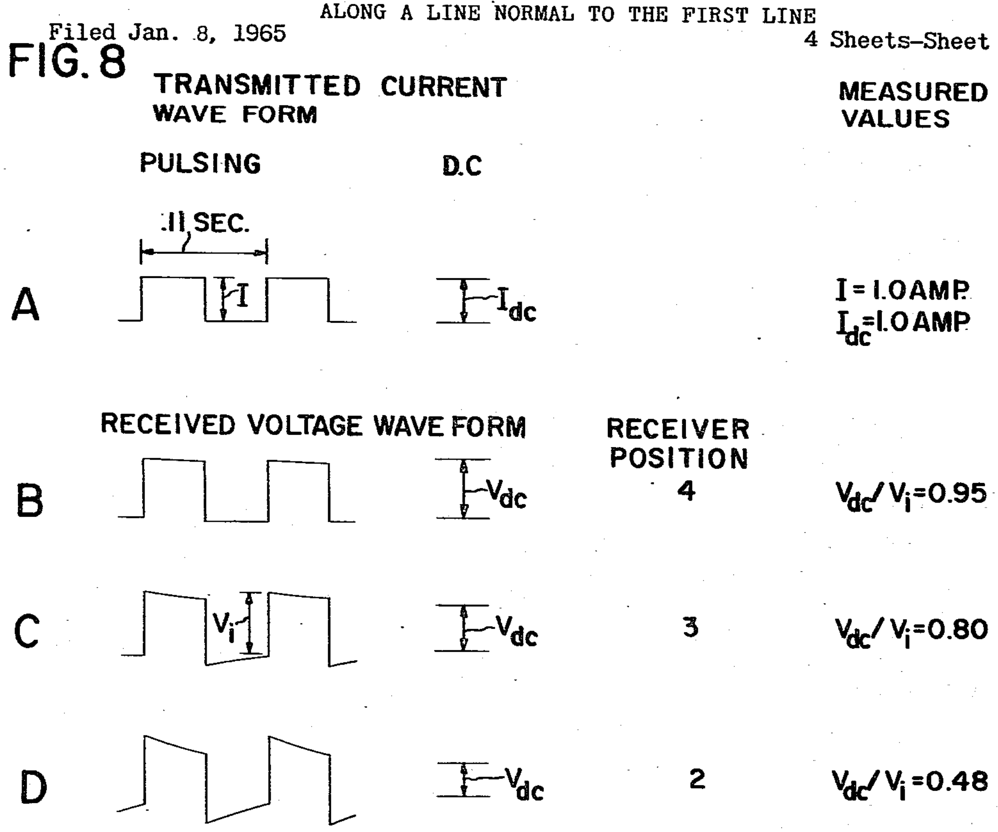
Figure 9:
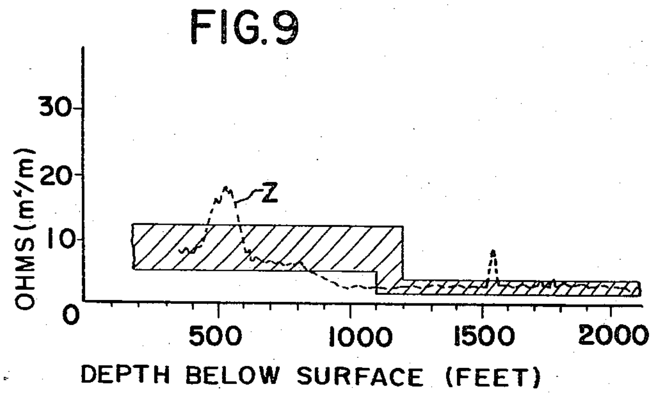

FIGURE 8 is a view showing waveforms during the test made with the arrangement illustrated in FIGURE 7, FIGURE 8A being the transmitted current wave pulse and FIGURES 8B–D being the received voltage wave forms with different detection arrangements; and FIGURE 9 is a graph of resistance versus depth below surface for the estimated variation of the resistance with depth as determined from FIGURE 8 and a curve showing a previously performed electrical log of a well in the area surveyed.

Referring now to FIGURE 1 of the drawing there is shown a schematic arrangement of a typical survey layout which includes a transmitting circuit generally indicated as 11 and a receiving circuit generally indicated as 12. The transmitting circuit 11 includes a low frequency transmitter 13 such as, for example, on the order of 10 c.p.s. or less for deep penetration. The transmitter is connected in a wire conductor 14 the ends of which are directly grounded to the earth to form two transmitting points A and B. The transmitting points A and B lie on a transmitting line which when a cross country traverse is being made is the line of traverse. While current can be established in the earth by means other than the directly grounded wire such as, for example, by magnetic inductive coupling, much more power can conveniently be transmitted into the earth and picked up from the earth by means of a directly grounded wire. Therefore, the references hereinafter made to transmission and detection of signals in the earth by means of directly grounded wires shall be interpreted to include, where permitted, other equivalent means. The transmitting wire 14 has a length L.

The receiving circuit 12 includes a receiver 16 for measuring the voltage induced in a detecting conductor wire 17 the ends of which are grounded to serve as receiving points $a$ and $b$. A number of different receiving wires are indicated as 1, 2, 3, 4, and 5 each of which has receiving points $a$ and $b$ but each of which is a different length. For all of the different receiving circuits 12 designated as 1–5 the receiving points $a$ and $b$ lie on a line which is normal to the transmitting line and passes through the transmitting point A. Each of the receiving circuits has a wire conductor length $l$ and has its receiving point closest the transmitting line spaced from the transmitting line by a distance $r$ which is shown equal to $l$. As will be explained in greater detail below, for obtaining a signal most sensitive to a resistance discontinuity at a depth $h$ below the surface of the earth, the parameters of the transmitting and receiving lines are selected substantially in accordance with the following equation:

$$h \leq r \leq L$$

For convenient laying of the detection conductors 17 the receiving circuit configurations 1–5 are selected as even fractions of the length L of the transmitting line, i.e.:

For position 1, $r=l=L$; for position 2, $r=l=L/2$; for position 3, $r=l=L/4$; for position 4, $r=l=L/8$; and for position 5, $r=l=L/16$.

When a step current is caused to flow in the transmitter circuit 11, an initial step is observed in the voltage detected in the receiving circuit 12 and corresponds to the direct signal transmitted from the transmitting circuit 11 to the receiving circuit 12 at the earth's surface. When a resistance discontinuity exists below the surface of the earth a transient response takes place and the voltage changes due to the reflected signal. An increase of voltage with time results if an increase in formation resistance occurs with depth, and conversely a decrease of voltage with time results if a decrease information resistance occurs with depth. The voltage finally stabilizes at the D.C. or steady state voltage. The ratio of the steady voltage $V_{dc}$ to the initial step $V_i$ is therefore indicative of the sub-surface resistive changes. The rate of change of the transient depends upon the depth $h$ of the discontinuity as well as on the probe dimensions and the earth resistivities $R_1$ and $R_2$ where $R_1$ is the resistance of the upper layer and $R_2$ is resistance of the lower layer. FIGURE 2 shows the calculated ratio of the steady state signal $V_{dc}$ to the initial voltage $V_i$ for the several receiver circuit arrangements 1–5 for a single resistive discontinuity at depth H, each of the figures being calculated for a different ratio of earth resistances, $R_2/R_1$. A comparison of the signals measured at several locations with the calculated figures shown in FIGURE 2 provides a means of selecting or estimating both the depth of any resistive discontinuities and the resistance ratio between the two layers. Measured signals at two different geographical regions will be given in the examples below with reference to FIGURES 4–9.

Although the curves of FIGURE 2 are for a simple two-layered earth, they can be used to estimate approximately the general characteristics of more complicated earth models if sufficient measurements are made. However, in general, it may be desirable to employ calculations for more complex models in order to obtain the best accuracy.

The use of the perpendicular arrangement between the transmitting and receiving circuits eliminates direct or non-reflective transients facilitating detection and identification of reflected transients. As is apparent from FIGURE 2 the transients rapidly approach zero as the distance $r$ between the transmitting circuit 11 and the receiving circuit 12 decreases to the value $h$ of the discontinuity. In view of this relationship it is apparent that at no point should the transmitting conductor 14 and the receiving conductor 17 approach much closer to each other than the depth of the possible discontinuity of interest or the direct signal will become exceedingly large compared with the reflected signal. Therefore, crossing of the two wires in a cross arrangement is not useful. Also a T arrangement, even with a gap between the leg and the top of the T, is unsuitable because in this case the mutual impedance between the transmitting and receiving wires is zero. It has also been found that the induced potentials in the receiving circuits 12 rapidly approach zero as the distance $r$ becomes large compared with the length L of the transmitting circuit. In order to maintain sufficient signal strength the value of $r$ should preferably not be greater than the transmitter length L. Thus, the criterion for the equation given above is established, i.e., to maximize the signals that are due to the deep discontinuities relative to those due to shallow effects and to provide sufficient amount of measurable pertinent data to permit separation and identification of the near surface and deep seated effects the electrical configuration should follow the equation $h \leq r \leq L$. While the equation establishes the desired length of $r$, the length $l$ of the receiving circuit is selected to produce desirable signal to noise ratio and signal strengths which do not differ much more than one order of magnitude for the different detection positions 1–5. It has been found that an appropriate length which gives both a desired signal to noise ratio and sufficiently uniform signal strengths and one which permits ease in the laying out of the various detection wire lengths in the field is where $l$ is equal $r$. The use of shorter detector wires is also possible but at some sacrifice in signal-to-noise ratio and it imposses more severe requirements on the receiver-amplifier performance. In some cases where it is important to minimize the handling of long wires a single short line may be used by moving it sequentially to each receiver location.

Figure 3:
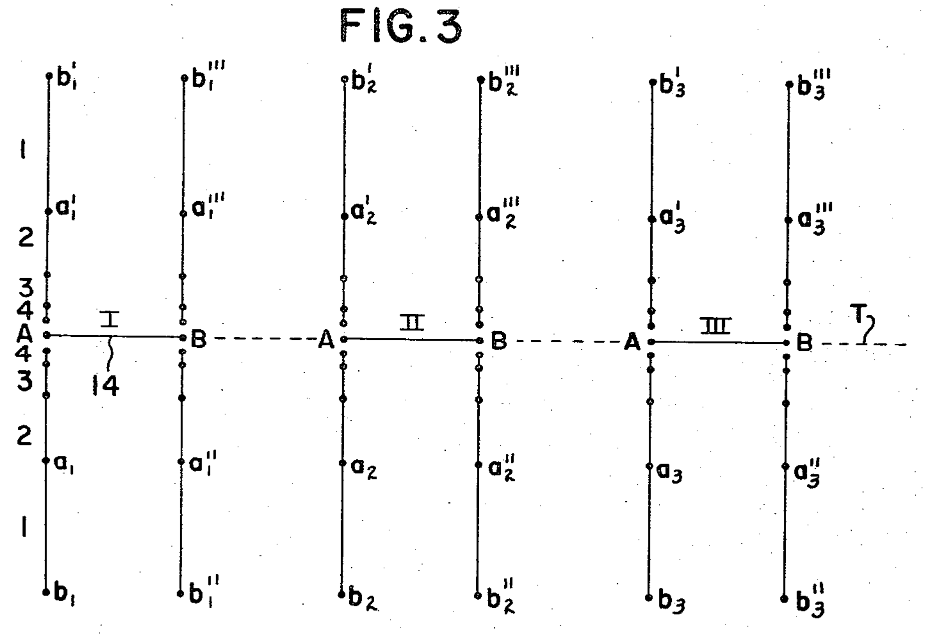
FIGURE 3 is a schematic drawing of a typical cross country traverse of transmitting and receiving wires employing the present invention.

FIGURE 3 illustrates a desirable configuration for laying out the transmitter and receiving wires for mapping an area by a cross country traverse along a line designated T. Since the transmitter conductor 14 must be relatively heavy gauge wire to handle the relatively heavy current flow through it and with its end transmitting points elaborately embedded in the earth to minimize the resistance to current flow at the earth electrode contact, the transmitting wire conductor 14 is stretched out to its length along the traverse line T and grounded at its transmitting end points A and B in position I. The different detection conductor configurations 1–5 (only 1–4 shown) are arranged on one side of the transmitter and along a line which is normal to the transmitting line at position A. Measurements are taken of the induced voltages between $a_1$ and $b_1$ for the different detection conductor configurations. These same conductor lengths are then aligned on the same first line but on the opposite side of the transmitter, and measurements are taken between the receiving points $a_1'$ and $b_1'$. Then without moving the transmitter line the same procedure of laying the detector lines and measuring induced voltages is performed at the opposite end of the transmitting line along a line through transmitting point B, first between the detection points $a_1''$ and $b_1''$ on one side of the transmitting line and then between detection points $a_1'''$ and $b_1'''$ on the opposite side of the transmitting line.

After the measurements have taken at the position I the transmitting line A–B is moved along the traverse line T, such as by pulling it along its length, and relocated at a new position shown as position II which may be spaced a reasonable distance such as L from the original position I. At position II detection readings are made first at both sides of one end $a_2$–$b_2$ and $a_2'$–$b_2'$ and then at the opposite end of the transmitting line $a_2''$–$b_2''$ and $a_2'''$–$b_2'''$. The process is repeated at position III and so on. Naturally, where less information is desired of the geological structure of a region, fewer measurements need be made such as, for example, only several measurements on one side of the transmitter at each end thereof. Conversely, where more information is desired the transmitting line can be moved a shorter distance along the transverse line such as, for example, one-quarter of its length and new measurements made.

Figure 5:
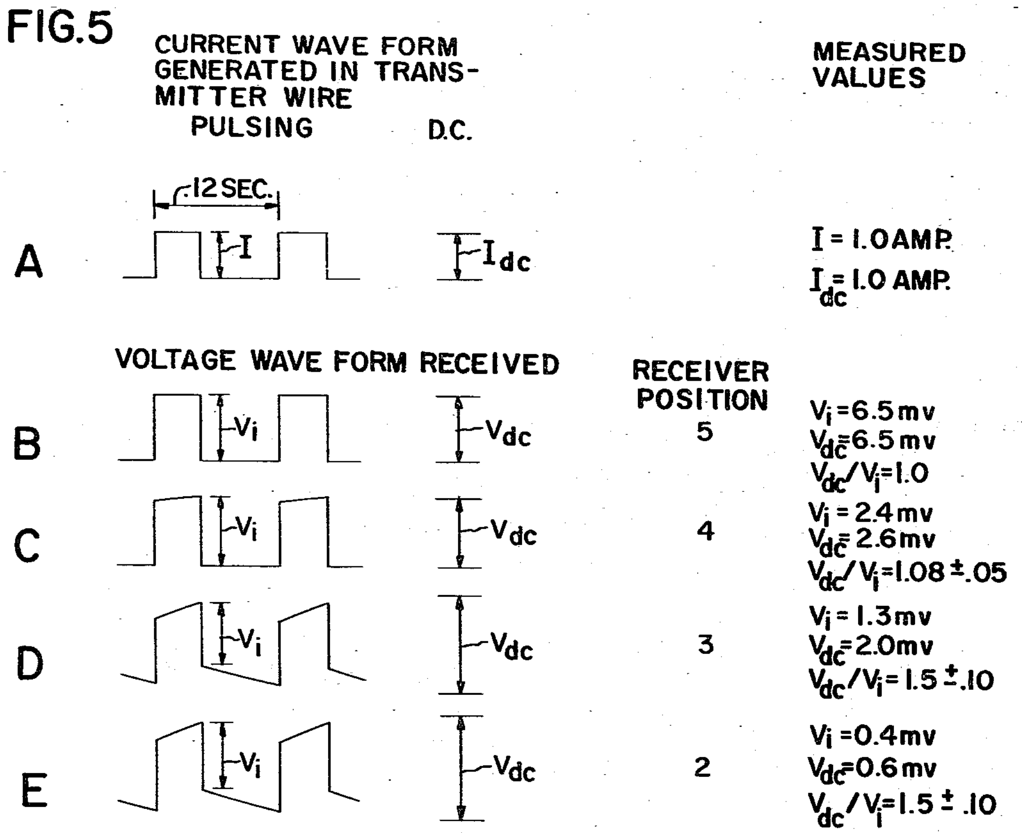
FIGURE 5 is a view showing wave forms during the tests made with the arrangements shown in FIGURE 4, showing the generated current wave form and FIGURES 5B–E showing the voltage wave form received in the various detecting wires in the different detecting arrangements.
Figure 6:
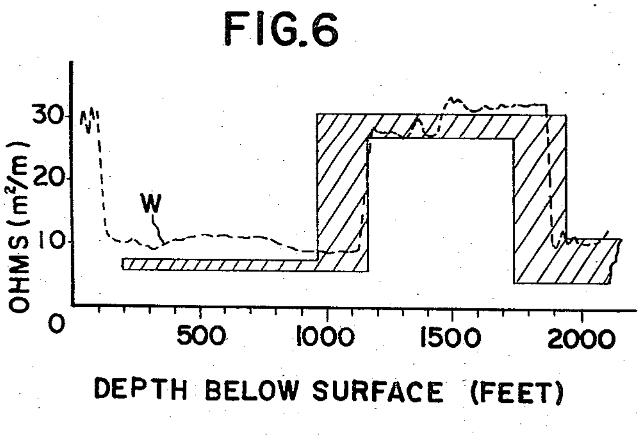
FIGURE 6 is a graph of resistance versus depth below surface for the estimated variation of resistance with depth as determined from FIGURE 5 and a curve showing a previously performed electrical log of a well in the same area.
Figure 4:
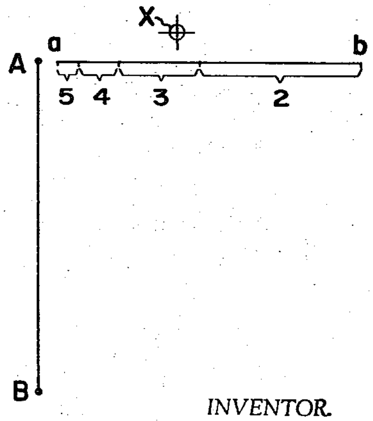
FIGURE 4 is a schematic drawing illustrating the arrangement of transmitting and detecting wires for a particular electrical survey.

In order to illustrate use of the present invention FIGURES 4–6 illustrate field tests carried out in the vicinity of the Frank E. Abbott well No. 1 in section 7–27s–19e, Kern County, California. The field equipment employed for taking the measurements included an oscillating relay alternately reversing connections from a small 90 volt dry cell battery to provide a square wave transmitter current of a frequency of about 8 cycles per second to a 5,000 foot transmitting wire and a low frequency (D.C. to 4,000 c.p.s.) amplifier-oscilloscope combination to provide a display of the received signal which was then recorded with a Polaroid camera. The layout of the transmitter and receiver wires is shown in FIGURE 4 and illustrating their relative location with respect to the Frank E. Abbott well No. 1 designated X.

Figure 2D:
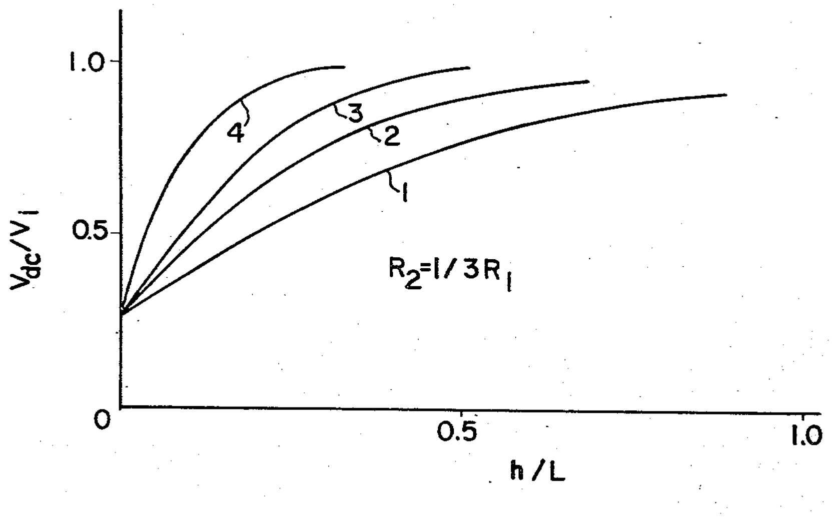

The transmitted current is illustrated in FIGURE 5A and the signals received at each of the receiver positions 5, 4, 3 and 2 are indicated in FIGURES 5B, 5C, 5D and 5E respectively. The measured initial step and the steady state voltages are indicated beside the waveforms observed. The positive transient indicated for positions 2 and 3 show that a high resistance layer exists at a reasonable depth. Since there is no apparent transient for position 5 this layer must be deeper than .1 times $L$ or 500 feet. A transient of approximately 8% of the initial step is measured for position 4, indicating the depth of the top of the high resistance layer as between 0.17 and 0.23 times 5,000 feet which is 1,000 feet plus or minus 150 feet. Since the ratio of the D.C. signal to the initial step at position 3 is about 1.4, the ratio of the high resistance below the discontinuity to the lower one above is much closer to 3.2 as shown in FIGURE 2B than to the other cases shown in FIGURES 2A, 2C and 2D. An estimate of $R_2/R_1$ of 3.0 appears best in view of the response at positions 3 and 4. The response measured at position 2 shows a value of the ratio of the steady state signal to the initial step well below that expected for a two layer earth in view of the results from position 3. The low value of this ratio at position 2 (approximately ½ what would be expected from FIG- URE 2B) must be due to a decrease in resistance somewhat above a depth of 0.5 mile (below which resistance changes become ineffective upon signals at position 2). A depth of the second discontinuity (where the resistance drops substantially) of 0.37 times 5,000 feet or 1,850 feet appears reasonable in view of the data from position 2.

The approximate variation of sub-surface resistance with depth as determined from the received data of FIGURE 5 is shown by the cross-hatched area shown in FIGURE 6. Superimposed on this figure is the curve W of a previously determined electrical log of the Frank E. Abbott well No. 1 designed as X in FIGURE 4. Comparison of the electrical log with the information obtained in accordance with the present invention shows reasonable accuracy for the method and apparatus used and indicates the results produced are adequate for most prospecting requirements. The thin high resistant layer near the surface as indicated by the electrical log W was not detected by the surface equipment used because of the very short transient times corresponding to such small depths compared with the limited high frequency response of the equipment used and because the closest receiver line used was several times as far from the transmitter line as the depth of the high resistant surface layer. However, there is no fundamental limitation to obtaining satisfactory estimates of sub-surface resistance variations at either much shallower or much deeper depths than those demonstrated by these measurements just described.

Figure 7:
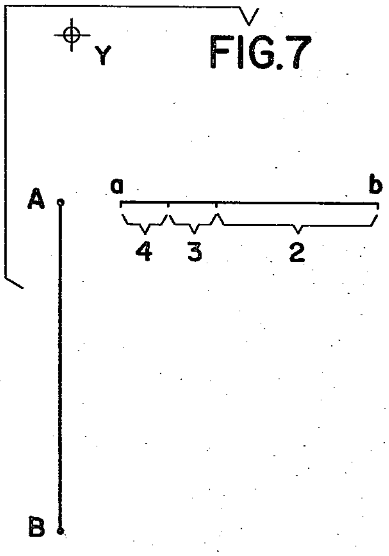
FIGURE 7 is a schematic arrangement of the measurements made at another area.

A similar series of measurements illustrated by FIGURES 7–9 were carried out in the vicinity of Patrick A. Doheny Crosby-Beer well No. 1 in section 21–26s–19e, Kern County, California. A somewhat different receiver layout as illustrated in FIGURE 7 was used for these tests. Shown in FIGURE 7 is the location Y of the Crosby-Beer well No. 1 and its position relative to the transmitter and receiver circuits. The wave form of the applied current is shown in FIGURE 8A and the voltage response for positions 4, 3 and 2 are shown in FIGURES 8B, 8C and 8D respectively. It is interesting to note a completely different type of transient is observed in this case from those shown in FIGURE 5 for the previous survey. It is apparent from the negative transient or decay in the wave form for positions 2 and 3 that there is a substantial decrease in resistance at depths. Since little of this transient is observed in the position 4 wave form, the depth at which the major part of the resistance decrease occurs must be approximately 1,200 feet from the surface. The large values of the transients observed at positions 2 and 3 indicate that a decrease in resistance to about ⅓ to ⅕ the upper formation value occurs. The relatively much larger transient at position 2 compared with position 3 indicates that the lower resistance continues down to the depth of at least 2,500 feet (below which changes in resistance could not appreciable effect the signal at position 2). The approximate variation of sub-surface resistance with depth as determined from the above is illustrated by the cross-hatched area in FIGURE 9 on which is superimposed a trace Z of a Schlumberger well log of the Crosby-Beer well No. 1. Again, reasonably good agreement between the resistance determined from the above measurements and that determined by the previously run electrical log is achieved. The reason for the slightly lower depth (1200) feet indicated by the surface measurements appears due to the fact that the surface measurements were made approximately ½ mile downdip from the Crosby-Beer well No. 1, and the depth of the more conductive formation is actually greater in the area of the surface measurements than at the well. Available geological information indicates that the sub-surface strata are tilted so that the Crosby-Beer well No. 1 is sufficiently updip from the surface measurements, that such differences in the formation depth are to be expected.

It has been found that with the method and apparatus in accordance with the present invention the larger variations in formation resistance with depth can be determined. To be readily detectable, such "large variations" should have a formation resistance of more than 50% above or below that of adjacent formations and should extend over an incremental depth of more than 15% of the distance to the surface.

Petroleum reservoirs generally have an electrical resistance which is much greater than that of the formation above the reservoir. Reservoirs at medium to shallow depths also often have thicknesses which are greater than 15% of the reservoir depth. It therefore appears that this electrical method should be an effective geophysical tool in exploring for petroleum. In particular, where the petroleum accumulations occur in stratigraphic traps, this electrical method appears definitely superior to the seismic, gravitational, and magnetic methods conventionally used in petroleum exploration. This is important because it has been estimated that the greater part of the world's undiscovered petroleum reserves are located in stratigraphic traps and not in the structural traps where the conventional geophysical methods are so effective.

This method should also find considerable application to the search for deposits of minerals other than petroleum since many such minerals have resistances differing substantially from that of the overlying strata.

Although the foregoing invention has been described in some detail by way of illustration and example for purposes of clarity of understanding, it is understood that certain changes and modifications may be practiced within the spirit of the invention as limited only by the scope of the appended claims.

I claim:

1. The method of electrical prospecting comprising the steps of: establishing a step or square-wave current in the earth between a first pair of points along a first line; detecting the variation with time of the voltage established by said current between a plurality of pairs of detection points with the pairs of detection points lying on a second line normal to said first line and passing through one of said transmission points and with difference distances between the first line and the closest point of each pair of detection points; recording the detected voltages established between said pairs of points by said current; and comparing the wave form of the recorded voltages for determining the variation of resistance with depth in the earth.

2. The method of claim 1 wherein said step of detecting the voltages established by said current between said pairs of points is performed first at the end of said first line adjacent one of said transmission points and then at the other end of said first line adjacent the other of said transmission points.

3. The method in accordance with claim 1 wherein the distance $r$ from said first line to the closest point of each pair of said detection points is equal to or greater than the depth $h$ in the earth to be evaluated for resistance changes and with the distance L between the two transmission points being equal to or greater than $r$.

4. The method in accordance with claim 1 wherein the distance $l$ between each pair of detection points positioned along the second line is equal to or less than the distance $r$ between the said first line and the closest point of such pair of detection points.

5. The method of electrical prospecting comprising the steps of: laying an insulated transmission conductor along a first line on the surface of the earth; grounding said transmission conductor at two transmitting points along said first line; generating a step or square-wave current in said transmission conductor for establishing a current in the earth between said transmitting points; laying an insulated first detection conductor along a second line normal to said first line at one of said transmitting points; grounding two detecting points of said first detection conductor, the detection point closest said first line being spaced a given distance from said one transmitting point; detecting the variation with time of the voltage induced in said first detection conductor by the current established in the earth from said transmission conductor; laying an insulated second detection conductor along said second line; grounding said second detection conductor at two detecting points with the point closest said one transmitting point being spaced from said one transmitting point by a distance greater than said given distance, detecting the initial and steady-state voltage induced in said second detection conductor by the current established in said earth from said transmission conductor, recording the detected voltages established between said pairs of detection points and, comparing the wave form of the recorded voltages for determining the variation of resistance with depth in the earth.

References Cited

UNITED STATES PATENTS

| | | | |
|---|---|---|---|
| 1,884,364 | 10/1932 | Sundberg | 324—1 |
| 1,997,163 | 4/1935 | Zuschlag | 324—1 |
| 2,189,377 | 2/1940 | Heiland | 324—1 |
| 2,192,404 | 3/1940 | Jakosky | 324—9 X |
| 2,200,096 | 5/1940 | Rosaire et al. | 324—1 |
| 2,217,780 | 10/1940 | West et al. | 324—1 |
| 2,234,956 | 3/1941 | Bilinsky | 324—1 |
| 2,390,270 | 12/1945 | Piety | 324—1 |

RUDOLPH V. ROLINEC, *Primary Examiner.*

WALTER L. CARLSON, *Examiner.*

G. R. STRECKER, *Assistant Examiner.*